US010816069B2

(12) United States Patent
Saravani

(10) Patent No.: US 10,816,069 B2
(45) Date of Patent: Oct. 27, 2020

(54) HYDRODYNAMIC LOCK-BASED CONTINUOUSLY VARIABLE TRANSMISSION GEARBOX

(71) Applicant: Amir Aghabeygi Saravani, Tehran (IR)

(72) Inventor: Amir Aghabeygi Saravani, Tehran (IR)

(*) Notice: Subject to any disclaimer, the term of this patent is extended or adjusted under 35 U.S.C. 154(b) by 0 days.

(21) Appl. No.: 16/425,867

(22) Filed: May 29, 2019

(65) Prior Publication Data

US 2020/0063844 A1 Feb. 27, 2020

(51) Int. Cl.
*F16H 48/27* (2012.01)
*F16H 47/08* (2006.01)
*F16H 48/26* (2006.01)

(52) U.S. Cl.
CPC .............. *F16H 47/08* (2013.01); *F16H 48/27* (2013.01); *F16H 48/26* (2013.01); *F16H 2048/265* (2013.01)

(58) Field of Classification Search
CPC .... F16H 47/08; F16H 47/06; F16H 2048/201; F16H 48/26; F16H 2048/265; F16H 48/27
USPC .............................. 475/91, 93, 323, 326, 339
See application file for complete search history.

(56) References Cited

U.S. PATENT DOCUMENTS

| | | | | |
|---|---|---|---|---|
| 868,935 A * | 10/1907 | Munsing | ................. | F16D 31/04 475/100 |
| 1,765,948 A * | 6/1930 | Sheridan | ................ | B60K 17/10 475/93 |
| 2,165,934 A * | 7/1939 | Mealey | ................... | F16D 67/00 475/93 |
| 2,223,413 A * | 12/1940 | Gasser | ...................... | F16H 3/04 475/326 |
| 5,139,468 A * | 8/1992 | Churchill | .................. | F16H 3/56 475/311 |

* cited by examiner

Primary Examiner — Roger L Pang

(57) ABSTRACT

A hydrodynamic lock-based CVT gearbox is disclosed. The apparatus is configured to continuously convert input rpm into different rpm's without interrupting a gearbox connection with an engine using a suspended and single-speed gearbox, and clockwise and counterclockwise rotation control of hydrodynamic lock. The apparatus is configured to utilize parallel paths pattern for power transfer, which includes a first power path and a second power path parallel to the first power path. The first power path is configured to reduce rotation and increase torque. The second power path is configured to provide equal rotation of the input and output axes. The apparatus is further configured to transfer the power from the first power path to the second power path by disposing a limiter at the first power path. At the end, the rotational force of the paths is combined and transmitted to the output of the gearbox.

16 Claims, 12 Drawing Sheets

HYDRODYNAMIC LOCK-BASED CONTINUOUSLY VARIABLE TRANSMISSION GEARBOX

BACKGROUND OF THE INVENTION

Gearbox is also known as power transmission or power train. It transmits the engine's torque to the wheels and also provides various transmission ratios to enable the speed of the engine to adapt different driving situations. The gearbox is used between the power generator and the consumer due to the telework power generator, for example, automobile, turbines, windmills, and hydraulic engines, etc. Each power generator has a functional role which shows its efficiency in different conditions. In the combustion engine, for example, rotation and torque must be simultaneously controlled in order to achieve optimum performance.

To achieve this, the combustion engine positioned between the consumer and the gearbox. It is expected that gearbox helps motor to operate on its optimal operation line (OOL) as much as possible. The gearbox inlet and outlet ratio and the opening amount of throttle valve could be controlled to keep the engine as much as possible at the optimal point corresponding to the input load of the vehicle. Today, a wide variety of gearboxes or transmissions could be found with different structures and features.

One type of transmission is manual transmission, which is used in motor vehicle applications. The manual transmission uses a driver-operated clutch engaged and disengaged by a foot pedal or hand lever for regulating torque transfer from the engine to the transmission; and a gear selector that can be operated by hand or foot.

Another type of transmission is sequential manual transmission is a non-traditional type of manual transmission used on motorcycles and high-performance cars for auto racing, where gears are selected in order, and direct access to specific gears is not possible. Yet another type of transmission is hydraulic automatic transmission, which uses a fluid coupling in place of a friction clutch and accomplishes gear changes by hydraulically locking and unlocking a system of planetary gears. The hydraulic automatic transmission has a defined set of gear ranges, often with a parking pawl that locks the output shaft of the transmission to keep the vehicle from rolling either forward or backward. Another type of transmission is a non-synchronous transmission that do not use synchronizing mechanisms. They are found primarily in various types of agricultural and commercial vehicles. The non-synchronous automatic transmission uses a one-way driving clutch that overruns as the next gear engages. There are other types of transmission, including the Automatic Manual Transmission (AMT), which is a type of automatic sequential manual transmission. Offered by Renault Group's Dacia under the "Easy-R" name, it is founded on electro-mechanical rather than hydraulic technology. The Easy-R automated transmission uses a traditional manual gearbox with an electronically controlled clutch and automated gear shifts, and the need for a clutch pedal is eliminated.

However, the conventional gearboxes have complex design, more weight and require an external clutch to control the speed of the engine. Further, the conventional gearboxes have lower power transmission efficiency.

Therefore, there is a need to provide a gearbox with optimal design to provide all the features of the CVT gearboxes with higher efficiency. There is also a need to provide an inexpensive gearbox with simple structure, lower weight and volume. There is also a need to provide a gearbox that could be used with a combination of two power generators for use in different applications, for example, hybrid cars. There is also a need to provide a gearbox having high efficiency, a transmission ratio range, stable operation, low noise, strong adaptability to use in different features and applications. Further, there is also a need to provide a gearbox that eliminates a need of separate clutch to control the speed of the engine.

SUMMARY OF THE INVENTION

A hydrodynamic lock-base continuous variable transmission apparatus configured to continuously convert the input rpm into different rpm' to reduce the rotation and increase the speed without interrupting the gearbox connection, is disclosed. The apparatus comprises an input member, a plurality of rotatable interconnecting members, a first node, a second node, a third node, a fourth node, an output member, a casing assembly and a locking mechanism. The input member receives a rotational device force from a drive source. In one embodiment, the plurality of rotatable interconnecting members includes a first interconnecting member, a second interconnecting member, a third interconnecting member and a fourth interconnecting member.

The first node is operatively connected to the input member via one of the interconnecting members. The second node is meshingly engaged with the first node. The third node is operatively connected to the second node via one of the interconnecting members. The fourth node is meshingly engaged with the third node. The output member is operatively connected to the fourth node via one of the interconnecting members, to transmit the rotational drive force to a drive wheel. The casing assembly is rotatably coupled to the input member and the output member. The casing assembly encases the first node, the second node, the third node and the fourth node, wherein the interconnecting member connecting the second node and the third node is operatively connected to the casing assembly. In one embodiment, the first node is a first gear, the second node is a second gear, the third node is a third gear, and the fourth node is a fourth gear. The gears are mounted in a chamber cavity to increase the torque.

The locking mechanism is configured to lock the first node and the second node. The locking mechanism comprises a channel fluidly connected to the aperture and a valve for controlling passage of a fluid from the channel. In one embodiment, the locking mechanism is a hydrodynamic-based locking mechanism. The rotational drive force is transmitted from the input member to the output member via a path connecting the first node, the second node, the third node and the fourth node, where the output member resists the rotation on receiving the drive force. The selective movement of the input member and the unlocking of casing assembly transmits the force back to the casing assembly that causes the rotation of the casing assembly. The selective locking of the casing assembly and the movement of input member increases torque and causes the output member to rotate slowly decreasing the output speed to form a first power path. The selective unlocking of casing assembly, locking of first node and second node, and the movement of the input member transmit the force to the output member through the rotation of casing assembly to form a second power path.

In one embodiment, the casing assembly comprises a central member sandwiched between a first member and a second member, and a third member. The central member comprises an aperture contoured to encompass the first node and the second node. The rotation of the first and second node causes flow of fluid without resistance on opening of the passage of the channel. In one embodiment, the pressure of the fluid increases on one side of the first and second nodes, and pressure of the fluid decreases on other side of the first and second nodes by narrowing the passage of the channel using a valve. The increase in fluid pressure provides rebounding force against the rotation of the first node and the second node on closing the passage of the channel.

In one embodiment, the apparatus further comprises a limiter, a clutch, and a set of rotors and a stator. The limiter is disposed at the first power path, which transfers the power to the second power path to achieve various percentage of output. The clutch is configured to connect with the third member to compensate an internal drop in the hydrodynamic lock. The set of rotors are disposed at the third member, whereas the stator is disposed with the rotor. In one embodiment, the stator and rotor are configured to store power as a generator.

One aspect of the present disclosure is directed to a continuous variable transmission apparatus comprising: (a) an input member receives a rotational drive force from a drive source; (b) a plurality of rotatable interconnecting members; (c) a first node operatively connected to the input member via one of the interconnecting members; (d) a second node meshingly engaged with the first node; (e) a third node operatively connected to the second node via one of the interconnecting members; (f) a fourth node meshingly engaged with third node; (g) an output member operatively connected to the fourth node via one of the interconnecting members, configured to transmit the rotational drive force to a drive wheel; (h) a casing assembly rotatably couples the input member and the output, wherein the casing assembly encases the first node, the second node, the third node and the fourth node, wherein the interconnecting member connecting the third node and the second node is operatively connected to the casing assembly; and (i) a locking mechanism configured to lock the first node and the second node, wherein the rotational drive force is transmitted from the input member to the output member through a path connecting the first node, the second node, the third node and the fourth node, wherein the output member resists rotation on receiving the drive force, wherein selective movement of the input member and unlocking of the casing assembly transmits the force back to the casing assembly that causes rotation of the casing assembly, wherein selective locking of the casing assembly and movement of the input member increases torque and causes the output member to rotate slowly decreasing output speed forming a first power path, and wherein selective unlocking of the casing assembly, locking of first node and second node, and movement of the input member transmits force to the output member through rotation of the casing assembly forming a second power path.

In one embodiment, the casing assembly comprises a central member sandwiched between a first member and a second member, and a third member, the central member comprises an aperture contoured to encompass the first node and the second node. In another embodiment, the locking mechanism is a hydrodynamic-based locking mechanism. In one embodiment, the locking mechanism comprises a channel fluidly connected to the aperture and a valve for controlling passage of a fluid from the channel. In one embodiment, the rotational force at the first and second node causes flow of fluid. In another embodiment, the fluid flows without resistance on opening a passage of the channel.

In one embodiment, pressure of the fluid increases on one side of the first and second node, and decreases on another side of the first and second node on narrowing the passage of the channel. In another embodiment, pressure of the fluid increases and provides a rebounding force against the rotation of the first node and the second node on closing the passage of the channel. In one embodiment, the apparatus further comprises a limiter disposed at the first power path, the limited transfers the power to the second power path, thereby enables to achieve various percentage of output. In another embodiment, the apparatus further comprises a clutch connected to the third member to compensate an internal drop in the hydrodynamic lock. In yet another embodiment, the apparatus further comprises a set of rotors disposed at the third member and a stator disposed with the rotor, wherein the stator and rotor are configured to store power as a generator.

Another aspect of the present disclosure is directed to a continuous variable transmission apparatus comprising: (a) an input member receives a rotational drive force from a drive source; (b) a plurality of rotatable interconnecting members; (c) a first node operatively connected to the input member via one of the interconnecting members; (d) a second node meshingly engaged with the first node; (e) a third node operatively connected to the second node via one of the interconnecting members; (f) a fourth node meshingly engaged with third node; (g) an output member operatively connected to the fourth node via one of the interconnecting members, configured to transmit the rotational drive force to a drive wheel; (h) a casing assembly rotatably couples the input member and the output, wherein the casing assembly encases the first node, the second node, the third node and the fourth node, wherein the interconnecting member connecting the third node and the second node is operatively connected to the casing assembly, the casing assembly comprises a central member sandwiched between a first member and a second member, and a third member, the central member comprises an aperture contoured to encompass the first node and the second node; and (i) a locking mechanism configured to lock the first node and the second node, wherein the rotational drive force is transmitted from the input member to the output member through a path connecting the first node, the second node, the third node and the fourth node, wherein the output member resists rotation on receiving the drive force, wherein selective movement of the input member and unlocking of the casing assembly transmits the force back to the casing assembly that causes rotation of the casing assembly, wherein selective locking of the casing assembly and movement of the input member increases torque and causes the output member to rotate slowly decreasing output speed forming a first power path, and wherein selective unlocking of the casing assembly, locking of first node and second node, and movement of the input member transmits force to the output member through rotation of the casing assembly forming a second power path.

In one embodiment, the first node is a first gear, the second node is a second gear, the third node is a third gear, and the fourth node is a fourth gear. In another embodiment, the locking mechanism comprises a channel fluidly connected to the aperture and a valve for controlling passage of a fluid from the channel. In one embodiment, the fluid flows without resistance on opening a passage of the channel, wherein pressure of the fluid increases on one side of the first and second node, and decreases on another side of the first and second node on narrowing the passage of the channel, and wherein pressure of the fluid increases and provides a rebounding force against the rotation of the first node and the second node on closing the passage of the channel. In another embodiment, the apparatus further comprises a limiter disposed at the first power path, the limited transfers the power to the second power path, thereby enables to achieve various percentage of output.

Another aspect of the present disclosure is directed to a hybrid continuous variable transmission apparatus comprising: (a) an input member receives a rotational drive force from a drive source; (b) a plurality of rotatable interconnecting members; (c) a first node operatively connected to the input member via one of the interconnecting members; (d) a second node meshingly engaged with the first node; (e) a third node operatively connected to the second node via one of the interconnecting members; (f) a fourth node meshingly engaged with third node; (g) an output member operatively connected to the fourth node via one of the interconnecting members, configured to transmit the rotational drive force to a drive wheel; (h) a casing assembly rotatably couples the input member and the output member, wherein the casing assembly encases the first node, the second node, the third node and the fourth node, wherein the interconnecting member connecting the third node and the second node is operatively connected to the casing assembly, the casing assembly comprises a central member sandwiched between a first member and a second member, and a third member, the central member comprises an aperture contoured to encompass the first node and the second node; (i) a locking mechanism configured to lock the first node and the second node; and (j) a set of rotors disposed at the third member and a stator disposed with the rotor, wherein the rotational drive force is transmitted from the input member to the output member through a path connecting the first node, the second node, the third node and the fourth node, wherein the output member resists rotation on receiving the drive force, wherein selective movement of the input member and unlocking of the casing assembly transmits the force back to the casing assembly that causes rotation of the casing assembly, wherein selective locking of the casing assembly and movement of the input member increases torque and causes the output member to rotate slowly decreasing output speed forming a first power path, and wherein selective unlocking of the casing assembly, locking of first node and second node, and movement of the input member transmits force to the output member through rotation of the casing assembly forming a second power path.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

Figure 1:
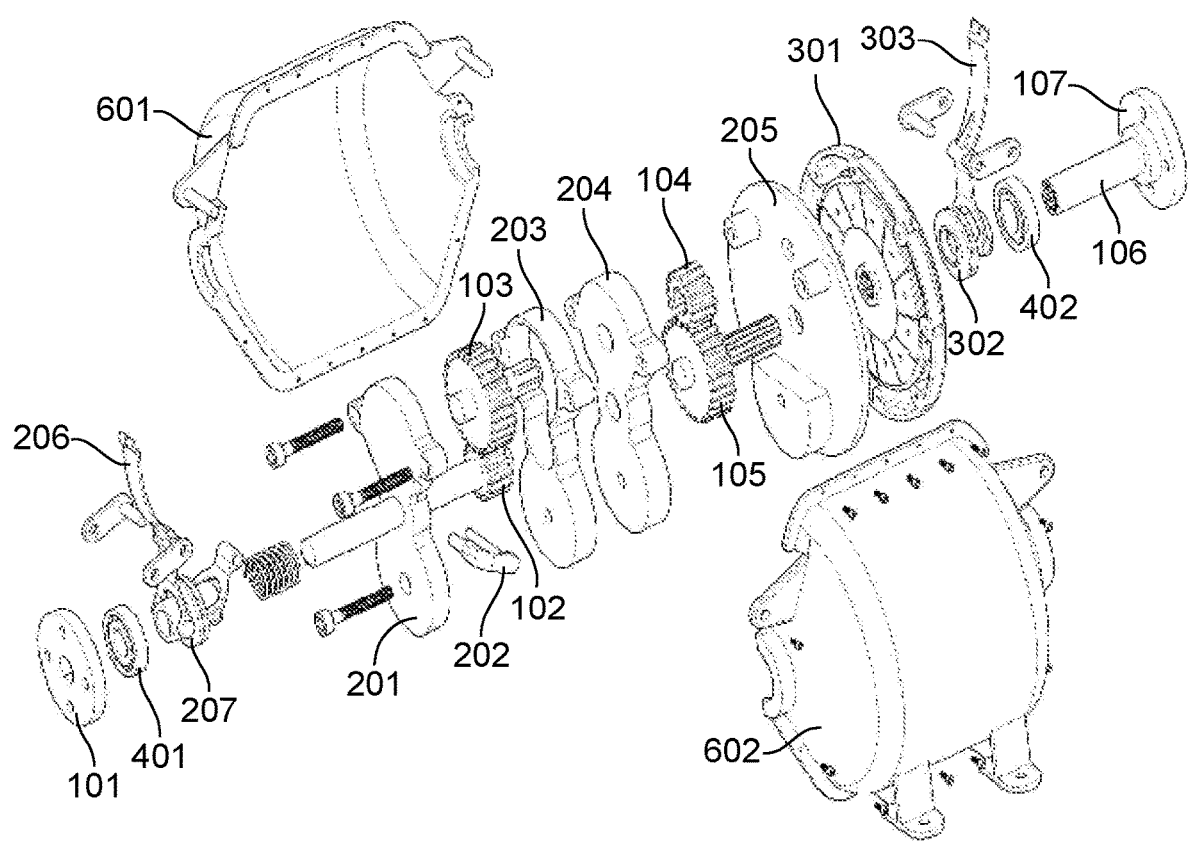
FIG. 1 exemplarily illustrates an exploded view of a hydrodynamic lock-based CVT apparatus for non-hybrid use in one embodiment of the present invention.

The present invention generally relates to a continuously variable transmission (CVT) gearbox, and more particularly relates to a hydrodynamic lock-based CVT gearbox.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses a continuous variable transmission apparatus. The present invention further discloses a hydrodynamic lock-based CVT gearbox. The present invention further discloses a hydrodynamic lock-based hybrid CVT gearbox.

One type of transmission is a semi-automatic transmission that combines manual transmission and automatic transmission. It allows convenient driver control of gear selection. For most of automotive history, automatic transmissions already allowed some control of gear selection using the console or shifter, usually to limit the transmission shifting beyond a certain gear and/or locking out the use of overdrive gears when towing. It enhanced such features by providing either steering wheel mounted paddle shifters or a modified shift lever, allowing the driver to enter a "manual mode" and select any available gear, usually in a sequential "up shift/downshift" manner. Some transmissions allow the driver to have full control of gear selection, though most will intervene to prevent engine stalling and redlining by shifting automatically at the low end and/or high end of the engine's normal operating range.

Another type of transmission is a Dual-Clutch Transmission (DCT), also referred as a twin clutch transmission or double-clutch transmission. It uses two separate clutches for odd and even gear sets. It can fundamentally be described as two separate manual transmissions with their respective clutches contained within one housing, and working as one unit. Although usually operated in a fully automatic mode, many also have the ability to allow the driver to manually shift gears in semi-automatic mode, albeit still using the transmission's electro hydraulics.

Yet another type of transmission is an electric variable transmission (EVT) consisting of two concentric electrical machines, meaning only two moving parts. It has two mechanical ports and one electrical port. It can function as a fully variable transmission with the possibility to be hybridized when using the electrical port. It is a fully scalable system with a range from light duty to very heavy-duty applications.

Another type of transmission is hydrostatic transmission which is another type of CVT, known as a hydrostatic CVT, that uses variable-displacement pumps to vary the fluid flow into hydrostatic motors. In this type of transmission, the rotational motion of the engine operates a hydrostatic pump on the driving side. The pump converts rotational motion into fluid flow. Then, with a hydrostatic motor located on the driven side, the fluid flow is converted back into rotational motion. Often, a hydrostatic transmission is combined with a planetary gearset and clutches to create a hybrid system known as a hydromechanical transmission. Hydromechanical transmissions transfer power from the engine to the wheels in three different modes. At a low speed, power is transmitted hydraulically, and at a high speed, power is transmitted mechanically. Between these extremes, the transmission uses both hydraulic and mechanical means to transfer power. Hydromechanical transmissions are ideal for heavy-duty applications.

There is yet another type of transmission and this is hydrodynamic transmission. This transmission works by the action of a rotary pump and a turbine. The hydrodynamic transmission was proposed in the beginning of the 20th century. Its design features a centrifugal pump and a turbine, located coaxially in such a way that their wheels form a toroidal cavity partially filled with pressure fluid. The fluid is impelled by the pump, which has a wheel connected to a motor. The energy received by the fluid from the pump is transmitted by the turbine to a driven machine. In a hydrodynamic transmission having only two wheels, the torques on both shafts are equal. Such a transmission is called a hydro-dynamic coupling. In rated operation of such a coupling, the rpm of the turbine shaft is lower than the rpm of the pump shaft by 1.5-4 percent. The efficiency of such a hydraulic clutch is 95-98 percent.

Yet another type of transmission is a continuously variable transmission (CVT), also known as a shiftless transmission, single-speed transmission, stepless transmission, pulley transmission, or, in case of motorcycles, a 'twist-and-go', is an automatic transmission that can change seamlessly through a continuous range of effective gear ratios. This contrasts with other mechanical transmissions that offer a fixed number of gear ratios. The flexibility of a CVT with suitable control may allow the input shaft to maintain a constant angular velocity even as the output speed varies. A belt-driven design offers approximately 88% efficiency, which, while lower than that of a manual transmission, can be offset by lower production cost and by enabling the engine to run at its most efficient speed for a range of output speeds. When power is more important than economy, the ratio of the CVT can be changed to allow the engine to turn at the RPM at which it produces greatest power. This is typically higher than the RPM that achieves peak efficiency.

In low-mass low-torque applications such as motor scooters, a belt driven CVT also offers ease of use and mechanical simplicity. A CVT does not strictly require the presence of a clutch. Nevertheless, in some vehicles, for e.g. motorcycles, a centrifugal clutch is added to facilitate a "neutral" stance, which is useful when idling or manually reversing into a parking space.

In yet another example of transmission, a continuously variable transmission-based planetary gear is present. In this invention, a planetary gearbox along with a hydrodynamic brake and a one-way roller clutch, have been used. In this gearbox, a solar gear is connected to the input shaft, and a planetary gear carrier is permanently connected to the output shaft. A planetary gear between the solar gear and the turning gear in the planetary carrier positioned vertically. The solar gear has a channel in which a hydraulic pump is located. One valve is to control the fluid flow inside the channel. To prevent the motion of the roundabout, the carriage of a planetary gear is used from a one-way roller clutch. In order to get rid of this gearbox, this one must neutralize this one-way roller clutch with its lever pressure. Few existing patent applications attempted to address the aforesaid problem are discussed as follows.

A parallel-hybrid transmission is present that comprises one or more electrical motor/generator units, at least one of which moves in an anti-engine-wise direction in certain operational modes. The motor/generators are coaxially or concentrically arranged with the transmission input and output shafts via planetary gear sets. Associated clutch closures selectively couple power to and from the sun gears and planetary carriers of the gear sets through a complex planetary gear configuration such as a Ravigneaux gear set, for switching between certain operational modes. The clutch and brake operations selectively achieve multiple ratio range operations including engine starting under electric power, high torque acceleration from a standstill, regenerative deceleration (braking), multiple ratio range operation, load sharing, rotation-matched step-less shifting and combined or individual continuously variable combustion engine and electric motor and/or generation modes.

Referring to FIG. 1, a continuous variable transmission apparatus comprises an input member 101, a first node 102, a second node 103, a third node 104, a fourth node 105, an output member 107, a plurality of interconnecting member, a casing assembly 200, and a clutch set 301. The plurality of interconnecting members includes a first interconnecting member, a second interconnecting member, a third interconnecting member and a fourth interconnecting member 106.

In the context of the present invention, a "node" is a junction of two or more power paths through which power is distributable between or among the power paths. For example, a "node" may receive power from a power path and distribute the power between or among two separate power paths. Examples of devices that may function as nodes include a gear, etc. Power paths include input shafts, output shafts, electric motor/generators, rotatable interconnecting members, etc.

The input member 101 is operatively coupled to the first node or gear 102 via the first interconnecting member. The input member 101 is configured to receive a rotational force from a drive source and transmits the rotational drive force to the first node 102. The second node or gear 103 is meshingly engaged with the first node 102. The second node 103 is axially integrated with the third node or gear 104 via the second interconnecting member. The third node 104 is meshingly engaged with the fourth node or gear 105. The fourth node 105 is operatively connected to the output member 107 via the third interconnecting member. The clutch set 301 is operatively connected to the output member 107 via the fourth interconnecting member 106.

In one embodiment, the first interconnecting member is an axle of the first gear 102, the second interconnecting member is an axle of the second gear 103, the third interconnecting member is an axle of the fourth gear 105, and the fourth interconnecting member 106 is an output axle of the apparatus. In one embodiment, the axle is a male spline. The third gear 104 comprises a central female spline to receive the male spline or axle of the second gear 103. The third interconnecting member is coupled to the fourth interconnecting member 106 attached to the output member 107 via the clutch set 301.

The casing assembly 200 comprises a first member 201, a central member 203, a second member 204, and a third member 205. The central member 203 comprises an aperture contoured to receive the first gear 102 and the second gear 103. The outer surface of the first gear 102 and the second gear 103 is adjacent to the central member 203. A contact surface of the central member 203 is polished with the ribs of the first gear 102 and the second gear 103 to provide easy moment. In one embodiment, the inner surface of the central member 203 is polished, so that the ribs of the first and second gear (102, 103) could rotate easily. The first interconnecting member passes through the center of the first member 201. The central member 203 is sandwiched between the first member 201 and the second member 204. The contact surface of the second member 204 is polished with the first gear 102 and the second gear 103, so that the ribs of the first gear 102 and the second gear 103 could rotate easily. The axis of the first gear 102 and the second gear 103 is coupled to the center of the central member 203.

The axis of the second gear 103 is coupled to the third gear 104 via the second interconnecting member, wherein the second interconnecting member passes through the second member 204. The third interconnecting member passes through the center of the third member 205 of the casing assembly 200. The third member 205 is coupled to the clutch set 301 and is adapted to rotate about the axis of the third interconnecting member. The clutch set 301 comprises a clutch cover, a friction plate and a pressure plate. The cover and the pressure plate are attached to the third member 205 and the friction plate is connected to the male spline axis i.e., the third interconnecting member of the fourth gear 105.

The apparatus further comprises a locking mechanism. In one embodiment, the locking mechanism is a hydrodynamic based locking mechanism. The locking mechanism comprises a channel in fluid communication with an aperture and a valve 202 to control the flow of the fluid from the channel. The channel connects the first node 102 and the second node 103 via the aperture. The valve 202 that controls the fluid flow is aligned with the first member 201. On an axis of the valve 202, a groove is created. By placing the groove opposite to the channel's input and output, the oil flow valve opens. By rotating the valve 202, the groove moves away from the channel's input and output and blocks the oil flow path. In one embodiment, the clutch set 301 is configured to prevent energy loss due to the internal reduction of the hydrodynamic lock. In another embodiment, the internal decline of the hydrodynamic lock could be minimized by using the proper oil and minimizing the distance between the parts.

The apparatus further comprises an actuating rod or component 207 and a motion lever 206 connected to the component 207. The motion lever 206 is connected to a pair of half covers (601, 602), hereinafter referred as cover (601, 602). The manipulation of the motion lever 207 causes the component 207 to move on the axis of the first gear. The component 207 further comprises at least two cylinder and a thrust bearing. The motion lever 206 is connected to the valve 202 and converts the linear motion to the rotary motion.

The apparatus further comprises a throwout bearing 302 coupled to the fourth interconnecting member 106. By pushing the throwout bearing 302 on the clutch, the distance between the pressure plate and the flywheel increases and the clutch plate disconnects. A lever 303 of the throwout bearing 302 is connected to the cover (601, 602). The apparatus further comprises a first bearing 401 that connects the first interconnecting member to the cover (601, 602). The apparatus further comprises a second bearing 402 that connects the fourth interconnecting member 106 to the cover (601, 602).

Figure 2:
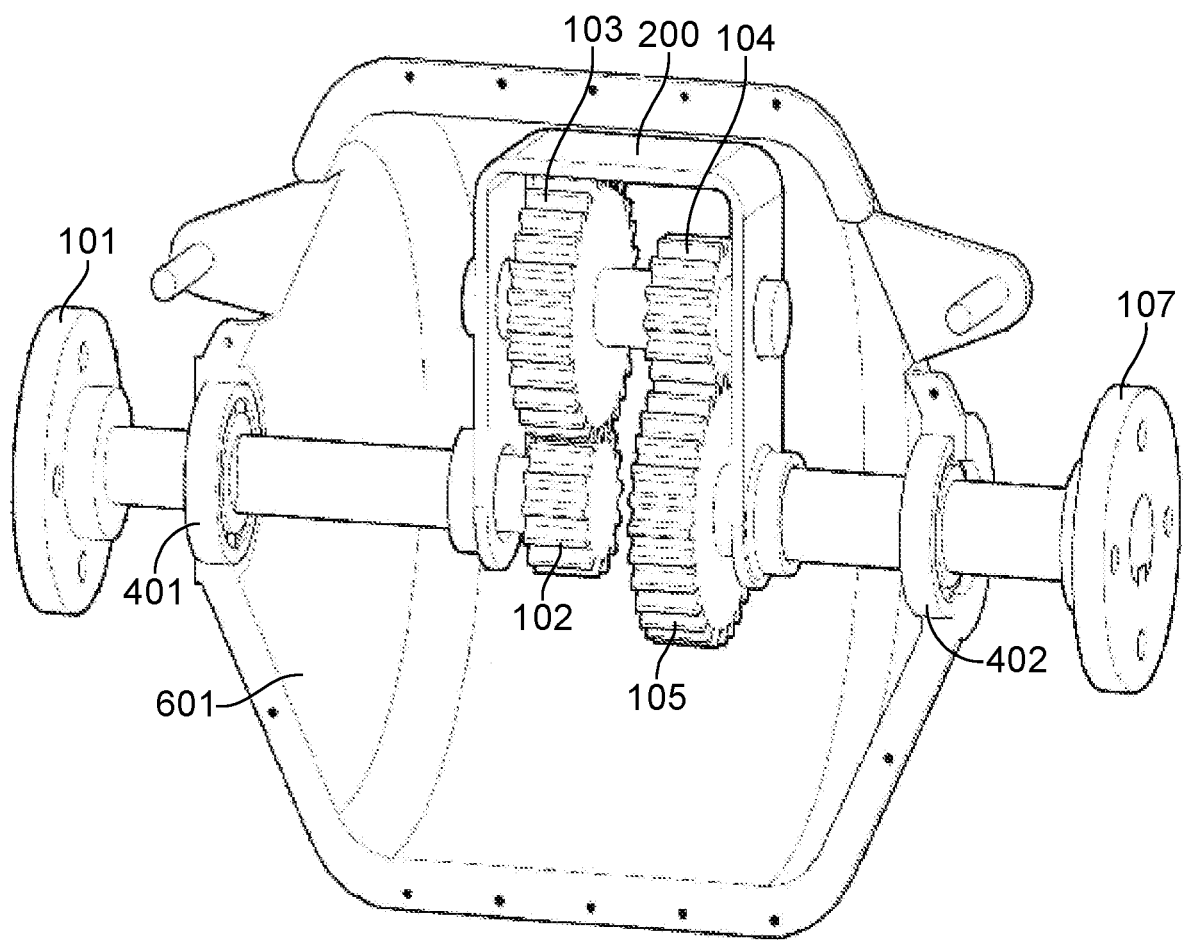
FIG. 2 exemplarily illustrates an arrangement of a casing assembly and nodes in one embodiment of the present invention.

Referring to FIG. 2, an arrangement of the casing assembly 200 covering the nodes or gears (102, 103, 104, and 105) is disclosed, according to an embodiment of the present invention. The casing assembly 200 is a hollow chamber, wherein the gears (102, 103, 104, and 105) are disposed in the chamber in such a way to increase the torque. In an embodiment, the gears (102, 103, 104, and 105) are provided with predefined specifications for different configurations to achieve the desired torque. In an embodiment, if the diameter of the second gear 103 is twice the first gear 102, the first interconnecting member rotates two circles and the second gear 103 spins one round. In an embodiment, third gear 104 connected with second gear 103 have the same rotation. The casing assembly 200 with the gear configurations is coupled to the first and second interconnecting members member via the bearings (401, 402) respectively. In one embodiment, the size of the gears (102, 103, 104, and 105) are different based on the consecutives such as the input axis and the output axis.

Further, the first and second interconnecting members, or inlet and outlet shafts are aligned inline, which enables the casing assembly 200 to rotate freely around the axis of the shafts. In one embodiment, the second gear 103 and third gear 104 are fixed together with one axle and are connected with two bearings on the casing assembly 200. The casing assembly 200 retains the distance between the gears (102, 103, 104 and 105). Further, the input member 101, gears (102, 103, 104, and 105), fourth interconnecting member 106, output member 107 and the casing assembly 200 are connected to the housing 601 through the bearings (401, 402).

Figure 7:
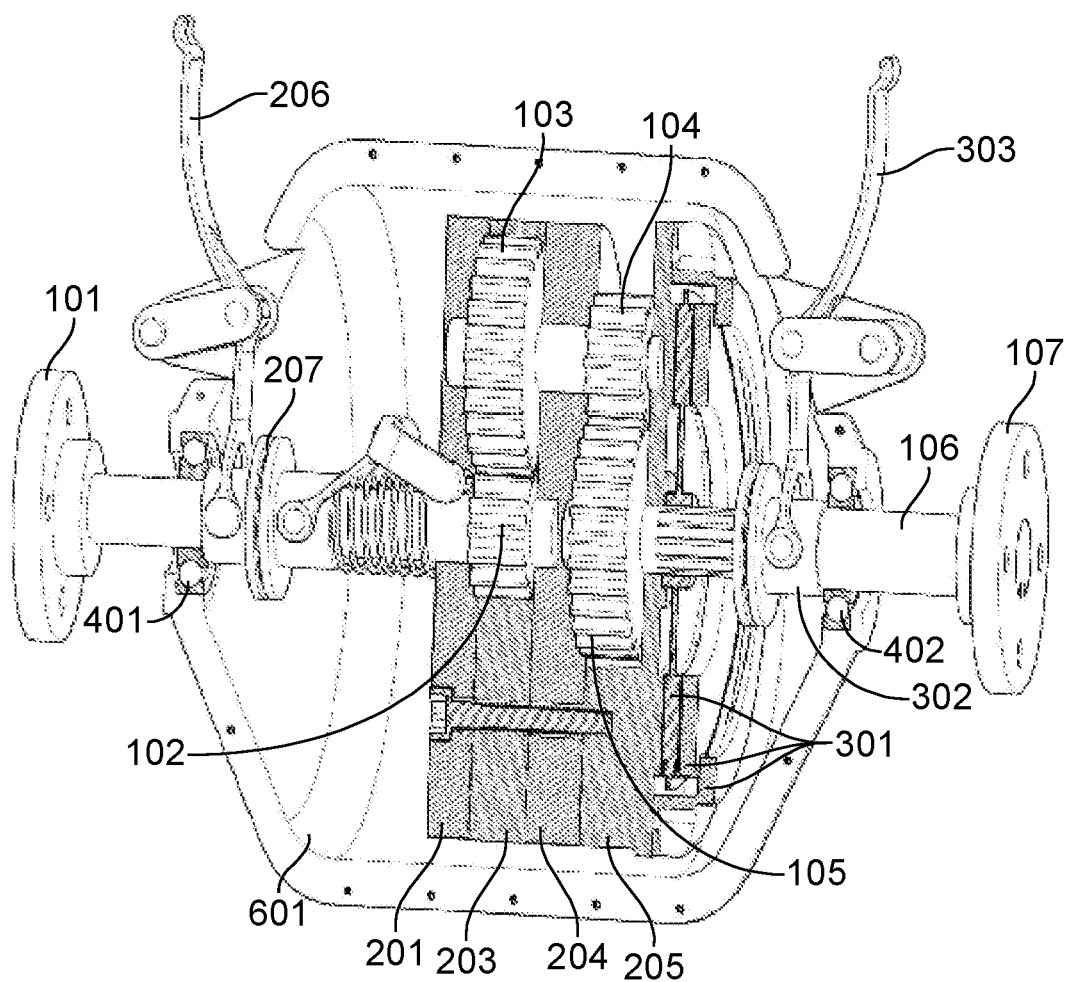
FIG. 7 exemplarily illustrates a cut-off view of non-hybrid gearbox in one embodiment of the present invention.

The turning of input member 101 executes different modes of the operations of the apparatus or gearbox such as first mode, second mode and third mode. In first mode, the input member 101 is turned right, where the casing assembly 200 is free to operate, i.e., the casing assembly 200 is not locked. The turning or rotating force is transmitted to the first gear 102 through the input axis. The first gear 102 drives the force to the fourth gear 105 through the second gear 103 and third gear 104. Then, the force is transmitted to the output member 107, which resists rotation. As a result, the force is transmitted to the casing assembly 200 through the axis of rotation of second gear 103 and third gear 104. In this mode of operation, while the input member 101 is rotated, the output member 107 does not have any rotations, similar to the occurrence of clutch disconnection (as shown in FIG. 7).

In second mode, the input member 101 is turned to the right side, whereas the casing assembly 200 is fixed or locked to the half cover 601. The rotating force is transmitted to the first gear 102 via the first interconnecting member. The first gear 102 drives the force to the fourth gear 105 via the second gear 103 and third gear 104. The force at fourth gear 105 is finally transmitted to the output member 107, where the output member 107 resists rotation. As a result, the casing assembly 200 does not rotate and the apparatus increases torque, which makes the output member 107 to rotate slowly. In this mode of operation, the apparatus increases the torque for the output member 107 and reduces the speed.

In third mode, the input coupling 101 is turned to the right side, wherein the casing assembly 200 is not locked. The second gear 103 is locked relative to the first gear 102, utilizing a hydrodynamic lock. In this case, the first gear 102 could not rotate the second gear 103, which enables the gear sets (102, 103) and casing assembly 200 to rotate together. The rotation of the input member 101 and the output member 107 of the apparatus are equal, that is the input and the output axis are seamlessly together.

Figure 3:
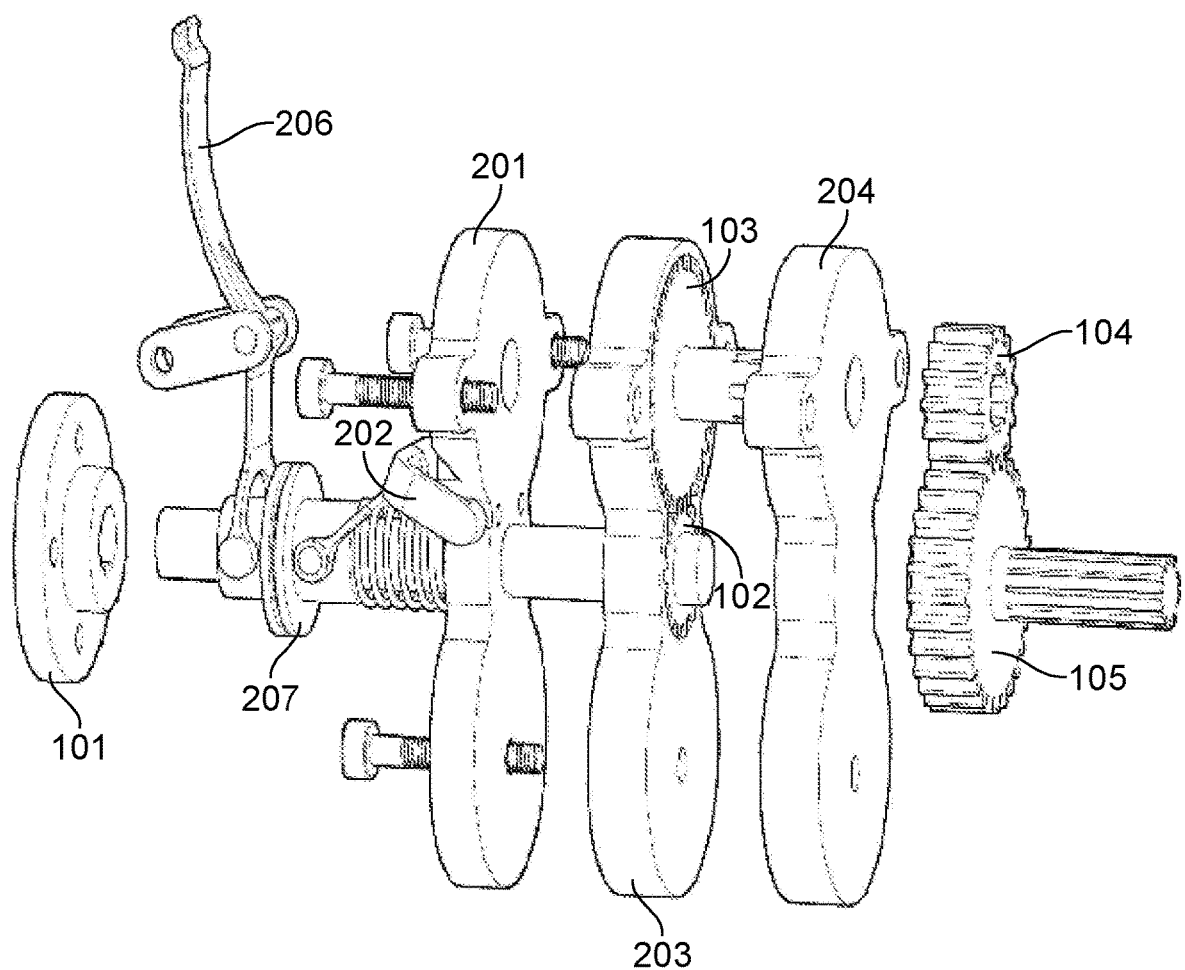
FIG. 3 exemplarily illustrates an exploded view of a hydrodynamic lock in one embodiment of the present invention.

Referring to FIG. 3, the arrangement of locking mechanism for the continuous variable transmission is disclosed. In one embodiment, the locking mechanism could be the hydrodynamic locking mechanism or any other locking mechanism. The gears (102, 103) are placed inside the central member 203, wherein both the sides of the gears (102, 103) are covered by first member 201 and second member 204. In one embodiment, the gears (102, 103) are positioned adjacently to the members (201, 203 and 204), where the distance between the members (201, 203 and 204) is very less. However, the gears (102, 103) could spin easily due to space created on both sides of the gears (102, 103). The channel is disposed at the space and the valve 202 is installed in the channel. The empty hydrodynamic lock space is filled with full of oil, where the hydrodynamic lock is insulated.

Figure 4A:
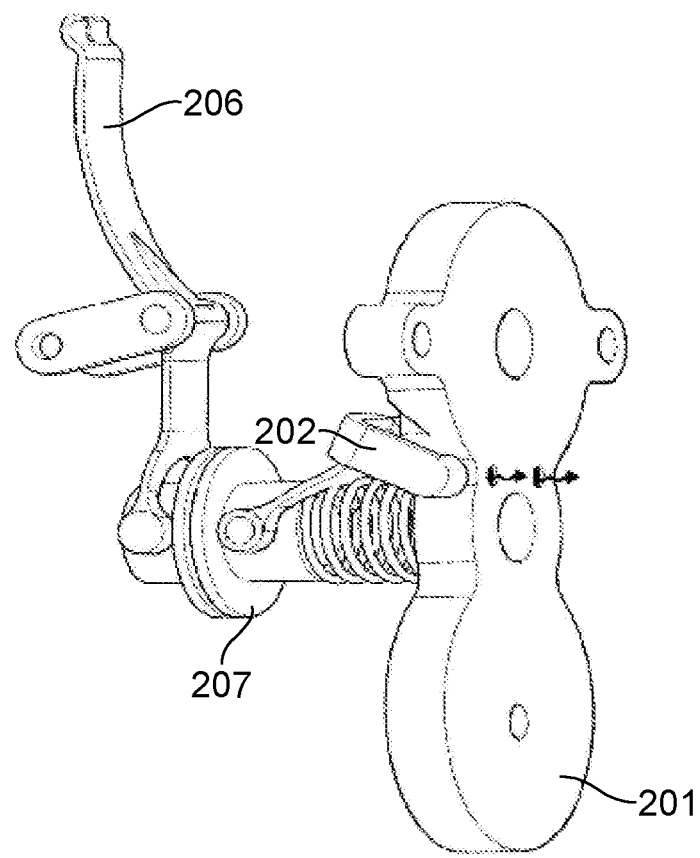
FIG. 4A exemplarily illustrates a method of opening the hydrodynamic lock by a fluid flow control valve in one embodiment of the present invention.
Figure 4B:
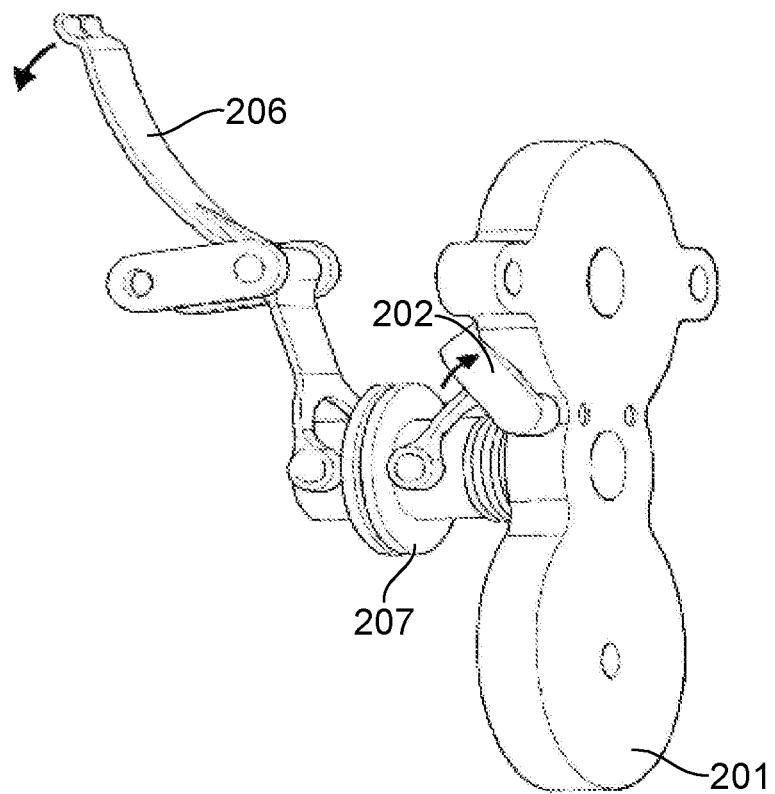
FIG. 4B exemplarily illustrates a method of closing the hydrodynamic lock by the fluid flow control valve in one embodiment of the present invention.

Referring to FIG. 4A-4B, a method of opening and closing of hydrodynamic locking mechanism is disclosed. The fluid control valve 202 in first member 201 is used to control the fluid flow during opening and closing. The locking mechanism comprises the channel in fluid communication with the aperture and the valve 202 to control the flow of fluid from the channel. By turning the gears (102, 103), the oil between the gears (102, 103) and the central member 203 is transmitted from one side of the gears (102, 103) to the other side, and returns to its original locations via the channel. The rotation of gears (102, 103) causes the oil to flow in the hydrodynamic lock. This cycle is repeated continuously.

At open position of channel, the actuating rod or component 207 with spring configuration allows the oil to pass through the apertures in the first member 201 without any resistance to flow. While narrowing the channel path by the valve 202, the pressure of the oil increases on one side and decreases on other side of the gears (102, 103). The increase in pressure translates into a rebounding force against the rotation of the gears (102, 103).

When the valve 202 is closer to the closed position, the pressure of the oil is further increased and the rotation of the gears (102, 103) becomes more difficult. At the closed position of channel, the component 207 moves on the axis of first gear 102, thereby compressing the spring and stopping the rotation of gears (102, 103) similar to locking mechanism. The phenomenon of internal decline in hydrodynamic locks obstructs the full locking of hydrodynamic lock. Due to the pressure difference in oil across the hydrodynamic lock, the oil penetrates into the low-pressure region via the distance between the members (201, 203 and 204).

While the internal decline amount of hydrodynamic lock has a direct relation with the amount of gear and shell looseness, and has inverse relation with viscosity and direct relation to the pressure difference in the hydrodynamic lock. By using the proper oil and minimizing the distance between the members (201, 203 and 204), the internal decline of the hydrodynamic lock could be minimized.

The different modes of operation are achieved including, but not limiting to the following five different states of gear shifting in the apparatus. The first state is a neutral state, where the input member 101 is turned to the right side (clockwise direction). In this case, the hydrodynamic lock is not locked. The casing assembly 200, including the first member 201, the valve 202, the central member 203, the second member 204, the third member 205, the second gear 103 and the third gear 104 are rotated to the left side (anti-clockwise direction). The fourth gear 105 is stationary, which enables the second gear 103 and third gear 104 to have a pivot rotation and also enables them to rotate around the first gear 102. In this state, the gears (103, 104) are rotated more than other modes, which is due to the rotation of first gear 102 and the resistance of the fourth gear 105. The increase in rotation of second gear 103 causes an increase in the flow of oil in the hydrodynamic lock. Therefore, highest flow of oil in the hydrodynamic lock is achieved in the neutral state.

The second state is between the neutral state until stop of casing assembly 200. At second state, the input member 101 is turned to the right side between the neutral state until the casing assembly 200. In this case, the valve 202 is adjusted to narrowing the channel, which creates the pressure difference in the oil by increasing the pressure on one side and decreases the pressure on other side. Due to the pressure difference, the oil could not transmit through the channel easily. As a result, the oil pressure hits the surfaces of hydrodynamic lock, thereby preventing the rotation of the gears (102, 103), and members (201, 203 and 204) like brakes. At some extent, the rotation of gears (102, 103) is reduced, which reduces the turning of casing assembly 200 in the opposite direction (left side or anti-clockwise direction). In this case, the rotational force of the first gear 102 is activated in paths. At first path, oil passes slightly through the channel, which causes the reverse rotation of casing assembly 200. At the second path, the input force makes the gears (102, 103, 104 and 105) to be rotated. The rotation increases torque and rotates the output member 107.

By continuous narrowing of channel path by valve 202, maximum power is attained at the output member 107. In the second state, different modes of operations could be achieved, where each mode generates a different percentage of power to the output member 107.

At third state, the input member 101 is turned right side and the channel path is narrowed by the valve 202 till the casing assembly 200. The casing assembly 200 is now stationary by locking with the cover (601, 602). This state is a transient state, where all power is transmitted to the output member 107 via gears (102, 103, 104, 105). In this case, the apparatus is a torque multiplier, where maximum torque is achieved.

At fourth state, the input member 101 is turned right side between the casing assembly until the unchanged state of transition state. While narrowing the channel by valve 202, the oil pressure in the hydraulic lock is increased, which makes the casing assembly 200 to rotate in the rotation direction of input member 101. In this case, the rotational force of the first gear 102 is activated from two paths. In first path, the input force causes the gears (102, 103, 104, 105) to rotate and increases the torque, and also rotates the output member 107.

In second path, the oil pressure prevents the rotation of gears (102, 103). As a result, the first gear 102 and the casing assembly 200 are rotated in clockwise direction. In this case, the power tends to go through the first path, the rotation of the gearbox at input and output axis is same. This increase in oil pressure in the hydrodynamic lock causes the power to pass through the second route. Between stop casing assembly 200 until transition unchanged state, hundreds of different modes could be achieved. In each case, a different percentage of power output reaches the output member 107. The fifth state is transition unchanged. At fifth state, the valve is closed and the oil circuit is blocked in the hydrodynamic lock, thereby the oil pressure is increased. The increased oil pressure prevents the rotation of gears (102, 103). As a result, the first gear 102 and the casing assembly 200 are rotated in clockwise direction. In this case, the rotation of input and output axis of the gearbox is the same.

Figure 5A:
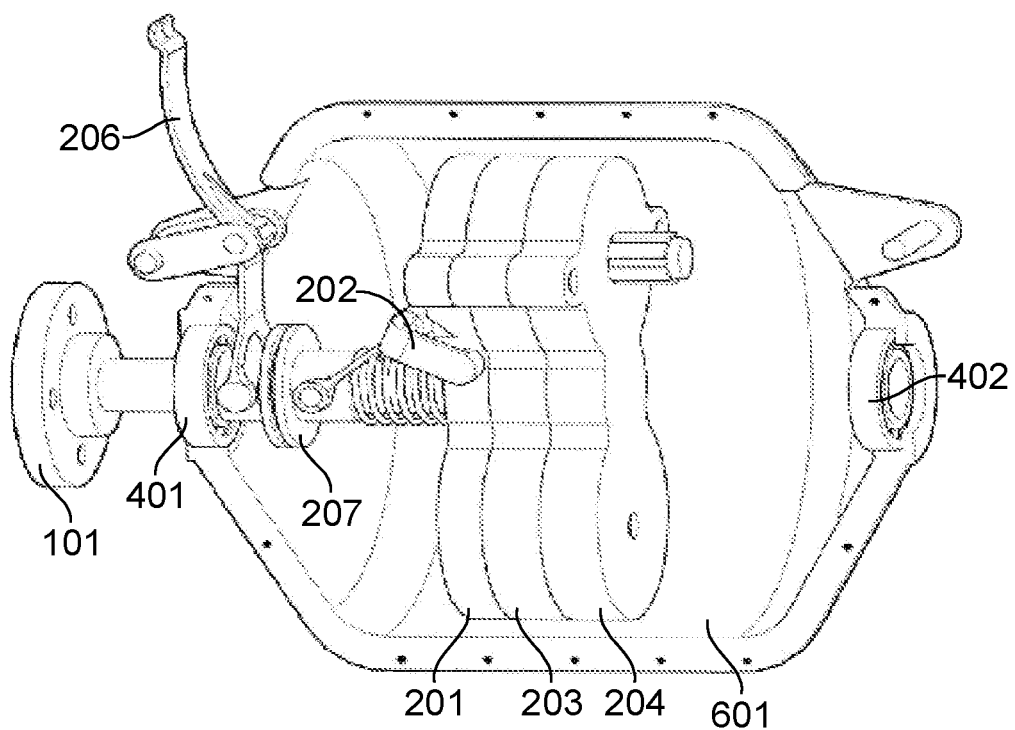
FIG. 5A exemplarily illustrates the hydrodynamic valve control of non-hybrid gearbox utilizing a motion lever, where the motion lever is released from the cover in one embodiment of the present invention.
Figure 5B:
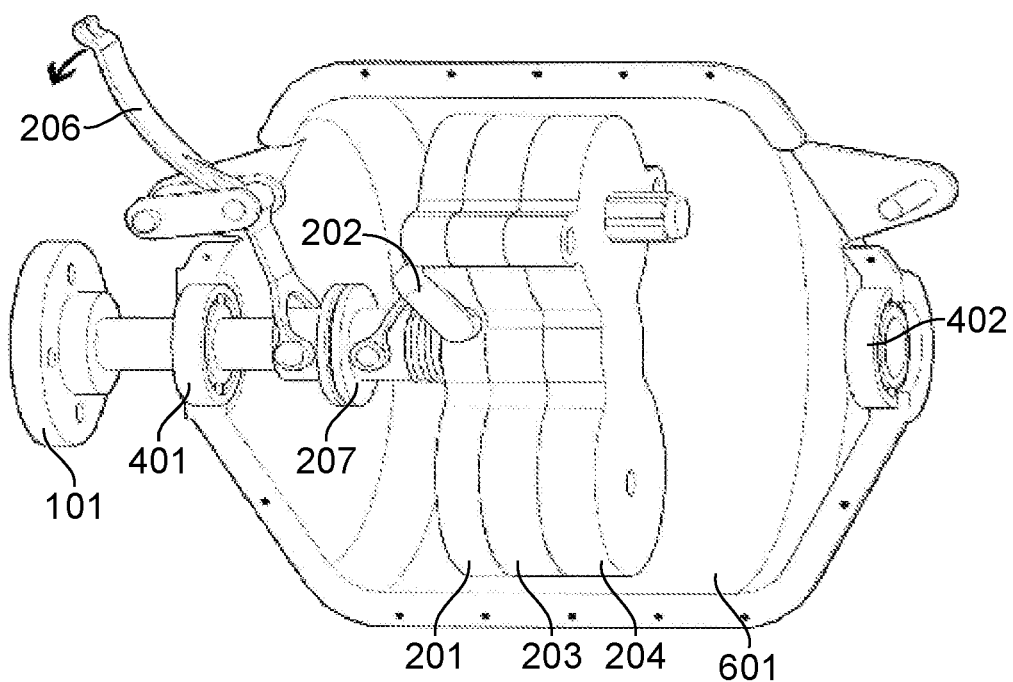
FIG. 5B exemplarily illustrates the hydrodynamic valve control of non-hybrid gearbox utilizing the motion lever, where the motion lever is attached to the cover in one embodiment of the present invention.

Referring to FIGS. 5A-5B, a motion lever 206 is used to control the hydrodynamic valve 202 of the locking mechanism or hydrodynamic lock is disclosed. In one embodiment, the motion lever 206 is configured to control the movement of the valve 202, thereby controlling the flow of the oil or brake fluid entered into the first member 201 of the casing assembly 200 to lock the first node 102 and the second node 103. In one embodiment, the locking mechanism further comprises an actuating rod or component 207, securely fitted on the axis of the first node 102 via a spring. The component 207 has rotating motion with respect to the casing assembly 200. In one embodiment, the component 207 is further configured to convert linear motion into rotary motion. In one embodiment, the component 207 further comprises at least two cylinders, which are connected via, but not limited to, a thrust bearing. When the motion lever 206 is pushed or pressed, the component 207 moves on the axis of the first node 102 and exerts force on the cylinders causing the brake fluid or oil flows or entered into the first member 201 of the casing assembly 200 with increased pressure to lock the first node 102 and the second node 103.

Figure 6:
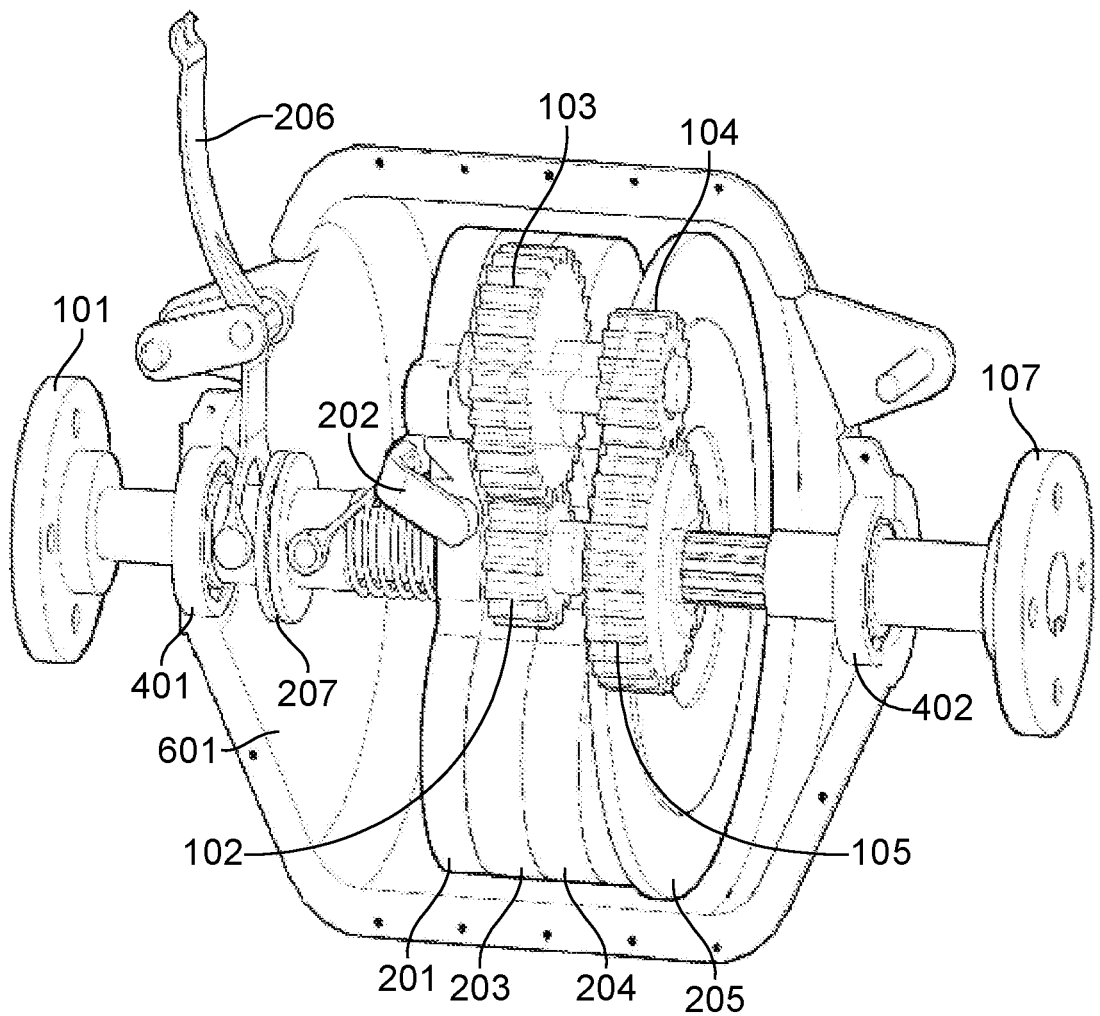
FIG. 6 exemplarily illustrates an arrangement of the casing assembly and the hydrodynamic lock of the non-hybrid gearbox in one embodiment of the present invention.

Referring to FIG. 6, the casing assembly 200 is securely positioned onto the first node 102, second node 103, third node 104, and the fourth node 105. In one embodiment, the casing assembly 200 further includes a first member 201, a central member 203, a second member 204 and a third member 205. The first node 102 and the second node 103 are securely and operably positioned into the aperture of the central member 203. Thereafter, the first member 201 securely coupled to one side of the central member 203 and the second member 204 is securely coupled to another side of the central member 203 using, but not limited to threaded bolts. The third member 205 is securely mounted to one side of the second member 204 of the casing assembly 200.

In one embodiment, the gearbox or apparatus further comprises a locking mechanism or hydrodynamic lock. The locking mechanism is used to counteract the rotation of the first node 102 and the third node 103. The locking mechanism comprises a channel in fluid communication with an aperture on the first member 201 and a valve 202 to control the flow of fluid from the channel. The channel connects the first node 102 and the second node 103 via the aperture. The valve 202 that controls fluid flow is aligned with the first member 201. The valve 202 is movably connected to the actuating rod or component 207 via a lever. In one embodiment, a motion lever 206 is movably coupled to the component 207 via a support member.

Referring to FIG. 7, the clutch set 301 is configured to prevent energy loss due to the internal reduction of the hydrodynamic lock. The clutch set 301 with clutch and disc is coupled to the third member 205. The clutch set 301 comprises throwout bearing 302 and a clutch plate 303. In one embodiment, the clutch plate 303 is a lever bearing, which is mounted on the third interconnecting member 106 via throwout bearing 302. The clutch plate 303 is free in normal state until it reaches the gearbox output rpm. When the output member 107 reaches the maximum rate of rpm, the clutch plate 303 is pressed between the disk and the third member 205 to compensate for the internal drop in the hydrodynamic lock by integrating the fourth gear 105 with the casing assembly 200. By pushing the throwout bearing 302 on the clutch set 301, the distance between the pressure plate and the flywheel is increased and the clutch plate 303 is disconnected. During high internal drop in the hydrodynamic lock, the clutch plate 301 is used to integrate the input member 101 and output member 107. Further, the other end of the lever bearing 303 is connected to the apparatus cover (601, 602).

Figure 8:
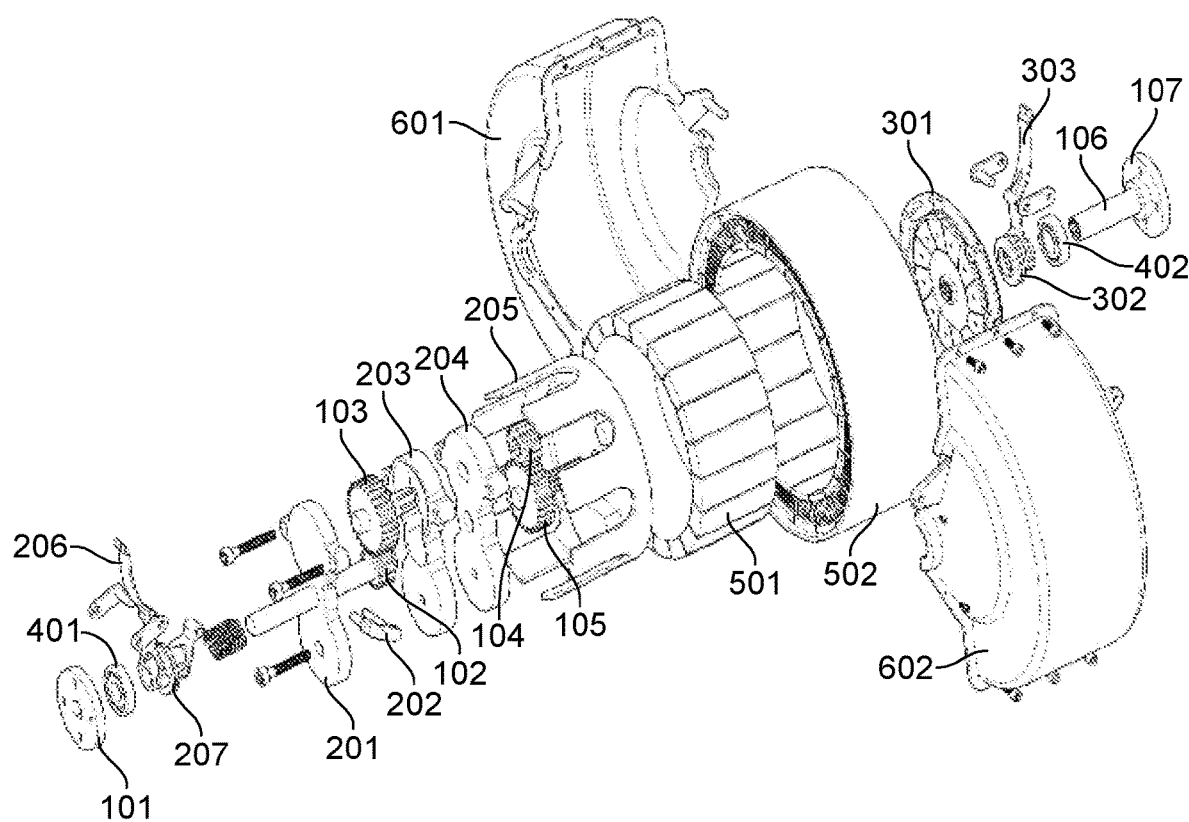
FIG. 8 exemplarily illustrates an exploded view of a hydrodynamic lock-based hybrid gearbox in one embodiment of the present invention.

Referring to FIG. 8, the apparatus further comprises a rotor 501 and a stator 502. In one embodiment, the stator 502 is securely mounted on the covers (601 and 602), inside the gearbox, which surrounds the rotor 501. The rotor 501 and the stator 502 could function as a motor in one mode and as a generator in other mode. The rotor 501 is securely positioned on a base of the third member 205. The third member 205 is adapted to rotate about the axis of the third interconnecting member 106. The clutch set 301 is securely coupled to another side of the third member 205.

The clutch set 301 is used to overcome the internal drop in the locking mechanism or hydrodynamic lock. The clutch set 301 is used to integrate the input and output shaft if the internal drop in the hydrodynamic lock is high. A cluster is added to the gearbox to achieve the transmission ratio of 1:1, i.e., the engine and the transmission's output rotate at the same speed. The clutch set 301 is mounted on a shaft of the fourth node or fourth gear 105. The clutch set 301 with a disc is connected to the third member 205. The pressure plate or clutch plate of the clutch set 301 is free in normal state until it reaches the gearbox output rpm.

When the speed of the output shaft reaches the maximum, the clutch plate is pressed between the disk and the third member 205 to compensate for the internal drop in the hydrodynamic lock by integrating the fourth gear 105 with the casing assembly 200. This clutch set 301 is provided as a solution to prevent energy loss due to the internal loss of the hydrodynamic lock. Due to low level of the internal drop of the hydrodynamic lock, the lock could be reached about 100% with a precise design at the time the fluid circuit is closed. Further the internal drop in the hydrodynamic lock could be reduced to some extent using a suitable viscosity fluid and minimize the tolerance of the parts that does not require the use of this clutch or similar solutions.

Figure 9:
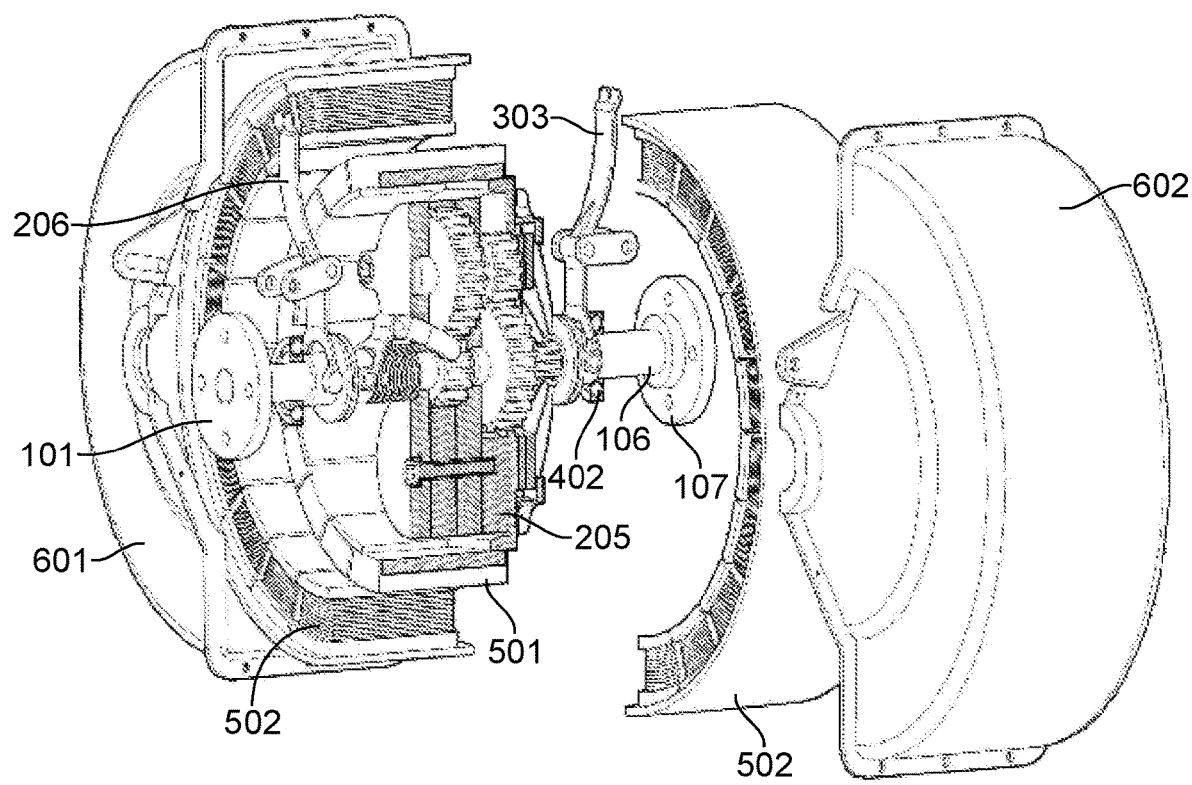
FIG. 9 exemplarily illustrates a cut-off view of the hybrid gearbox in one embodiment of the present invention.

Referring to FIG. 9, the apparatus used as a hybrid gearbox is disclosed. The gearbox could be used with two hydrocarbon and electric motors simultaneously and separately by applying a few small changes. The power of the gearbox could be converted to electrical energy at the time of the release of the gearbox and stored in addition to the benefits of hybrid. The rotor 501 is configured to rotate in a direction (e.g. counter clockwise) along with the casing assembly 200 to generate a varying magnetic flux.

In one embodiment, the rotor 501 and the stator 502 includes a plurality of conductors. The rotor 501 is further configured to generate the varying magnetic flux. The stator 502 converts the varying magnetic flux field to electric current. In one embodiment, stator 502 generates an electromotive force (EMF) within the electrical conductors which encircles the varying magnetic flux generated by the rotor 501. When the gearbox is in idle mode, the rotor 501 is rotated along with the casing assembly 200 in the counter clockwise direction to produce the varying magnetic field. Then the stator 502 generates the electromotive force and transfers to energy storage devices for using in a hybrid mode, thereby preventing the loss of energy in the release mode of combustion engines. The output of two separate power generators could be combined using this gearbox or they could be separately used.

When using two motors simultaneously, it is enough to feed the stator 502 with electricity, so that the rotor 201 will rotate in the clockwise direction by the electromagnetic induction. In this case, the power generated by the combustion engine is combined with the force generated by the rotor and stator (501 and 502) and transmitted to the output member 107. The rotor 501 and the stator 502 could function as a motor in one mode and as a generator in another mode. In one embodiment, the rotor and stator (501 and 502) are configured to convert power of rotation to electricity. In another embodiment, the rotor and stator (501 and 502) are configured to convert electricity to rotary motion.

For separate use of the electric motor, a braking system for the combustion engine is must be fitted to prevent the electric motor from transferring to the engine. Also, the locking mechanism or hydrodynamic lock should be open. In this case, with the stator's electric supply, the power generated by the electromotor alone drives the output member 107. To turn on the combustion engine, the combustion engine brakes are released and the hydrodynamic lock is closed so that the electromotor is in operation rotates the combustion engine and turn it on.

Figure 10:
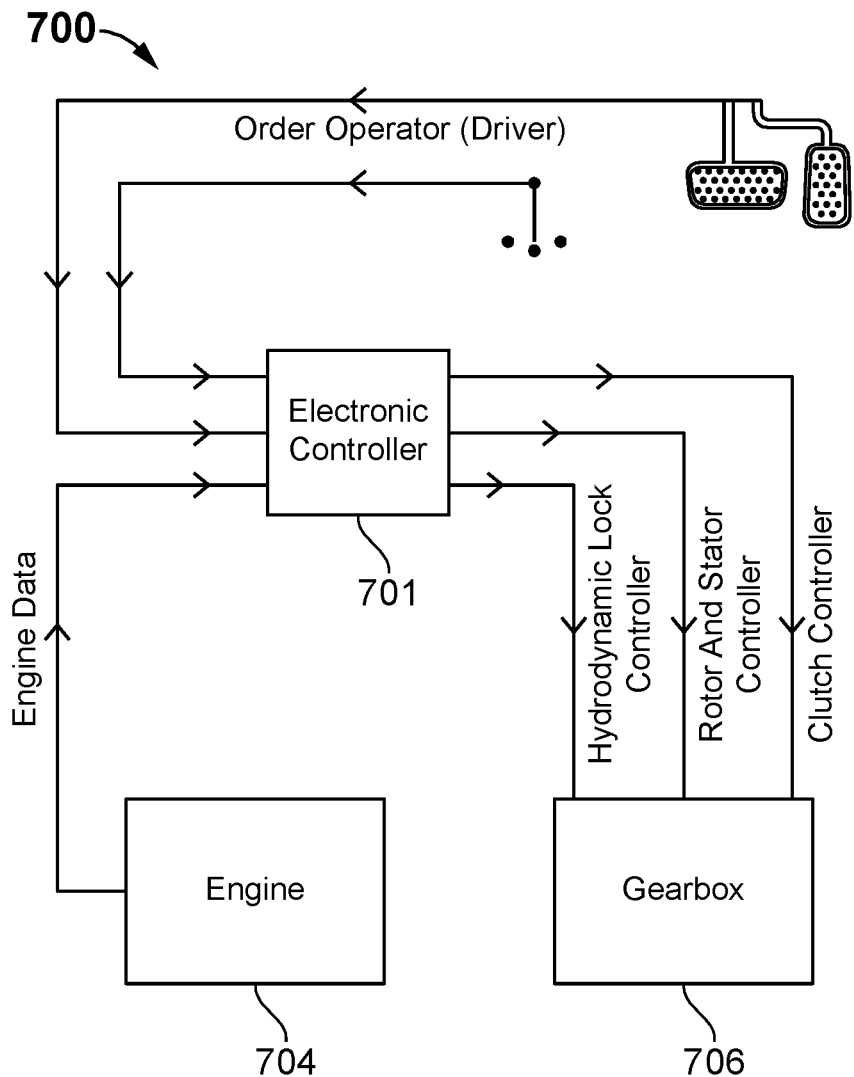
FIG. 10 exemplarily illustrates a schematic arrangement of an electronic control circuit of the gearbox in one embodiment of the present invention.

Referring to FIG. 10, an electronic control circuit 700 of the gearbox 706 is disclosed. In one embodiment, the circuit 700 includes an electronic controller 701, which is in communication with one or more components such as the gearbox 706, engine 704, hydrodynamic lock, clutch, the order operator, and the stator 502 and the rotor 501. The electronic controller or electronic control unit (ECU) 701 is configured to control the operations of the components, for example, but not limited to, the gearbox 706, the engine 704, hydrodynamic lock, clutch, and the stator 502 and the rotor 501 of the automobile, for example, a car, in order to achieve optimum performance.

The gearbox has the advantages of high efficiency, low cost, and more reliable. The apparatus could produce large ratios between the gearbox input and output speeds. The gearbox could produce hundreds of different ratios. The gearbox does not require to disconnect from the engine when changing the speed. The disconnection of the engine with the tires occur in the gearbox itself for engine operation in an auto stop mode. The gearbox has simple design and reduce the cost of the manufacturing process. The number of parts used in this gearbox are less and the parts used in the industry are very popular and no special technology is required in their production. The gearbox has low depreciation hence the lifetime is improved.

This gearbox does not require a separate clutch. In this gearbox, the fully opening of the hydrodynamic lock circuit prevents the torque transmission to the output shaft and acts like a clutch. In case of high accuracy in the construction of the hydrodynamic lock and low internal losses, this clutch is no more required. The gearbox could convert the mechanical energy generated by lowering or stopping the output shaft 107 into useful electrical power using the rotor 501 and the stator 502 and saves energy.

The output of two separate power generators can be combined using this gearbox or they can be separately used. This feature can be used to build hybrid cars. Greater productivity can be achieved in fuel consumption, greater power, longer drive distances with a refueling load and thus reduced greenhouse gas emissions. The clutch set is used to overcome the internal drop in the locking mechanism or hydrodynamic lock. Due to low level of the internal drop of the hydrodynamic lock, the lock could be reached about 100% with a precise design at the time the fluid circuit is closed. There are no depreciation parts in the gearbox. In addition, the components of the gearbox are interconnected with each other to minimize the risk of damage. Hence, the gearbox is quite reliable.

In one embodiment, the gearbox uses one or more parallel paths used for power transmission within the gearbox. The rotational force of the input to the gearbox is simultaneously available on different paths. There are at least two parallel paths in the gearbox. The power from the engine is transmitted to both parallel paths. There is no limit to the division of forces between the parallel paths. In one embodiment, at least one parallel path is an easy path and other parallel path is a difficult path. In easy path, the gearbox increases the torque and reduces the rotational speed.

In one embodiment, the rotation of the input axis and the output axis are equal in the difficult path. The difficult path and the easy path are parallel to each other. Always the rotational force tends to cross the easy path. For example, if the force passing from the easy path, then a car moves at a lowest speed with a maximum torque.

In one embodiment, the apparatus or gearbox further comprises a limiter disposed at the first power path, the limited transfers the power to the second power path, thereby enables to achieve various percentage of output.

In this case, depending on the degree of resistance, part of the rotational force passes through the easy path and the other part of the difficult path. By increasing the limit in the easy path, the transfer of power from the difficult route will increase. As a result, the rotation of the output axis increases by the gearbox. If we block the easy path completely, all the rotational force passes via the difficult path. In this case, the gearbox input and output are equal. At the end, the rotational force of the easy path and the difficult path are combined and transmitted to the output of the gearbox.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

What is claimed is:

1. A continuous variable transmission apparatus comprising:
   an input member receives a rotational drive force from a drive source;
   a plurality of rotatable interconnecting members;
   a first node operatively connected to the input member via one of the interconnecting members;
   a second node meshingly engaged with the first node;
   a third node operatively connected to the second node via one of the interconnecting members;
   a fourth node meshingly engaged with third node;
   an output member operatively connected to the fourth node via one of the interconnecting members, configured to transmit the rotational drive force to a drive wheel;
   a casing assembly rotatably couples the input member and the output member wherein the casing assembly encases the first node, the second node, the third node and the fourth node, wherein the interconnecting member connecting the third node and the second node is operatively connected to the casing assembly, the casing assembly comprises a central member sandwiched between a first member and a second member, and a third member, the central member comprises an aperture contoured to encompass the first node and the second node, and
   a hydrodynamic-based locking mechanism configured to lock the first node and the second node,
   wherein the rotational drive force is transmitted from the input member to the output member through a path connecting the first node, the second node, the third node and the fourth node, wherein the output member resists rotation on receiving the drive force,
      wherein selective movement of the input member transmits the force back to the casing assembly that causes rotation of the casing assembly,
      wherein movement of the input member increases torque and causes the output member to rotate slowly decreasing output speed forming a first power path, and
      wherein the locking of the first node and the second node, and movement of the input member transmits force to the output member through rotation of the casing assembly forming a second power path.

2. The apparatus of claim 1, wherein the locking mechanism comprises a channel fluidly connected to an aperture and a valve for controlling passage of a fluid from the channel.

3. The apparatus of claim 1, wherein the rotational force at the first and second node causes flow of fluid.

4. The apparatus of claim 2, wherein the fluid flows without resistance on opening a passage of the channel.

5. The apparatus of claim 2, wherein pressure of the fluid increases on one side of the first and second node, and decreases on another side of the first and second node on narrowing the passage of the channel.

6. The apparatus of claim 2, wherein pressure of the fluid increases and provides a rebounding force against the rotation of the first node and the second node on closing the passage of the channel.

7. The apparatus of claim 1, further comprises a limiter disposed at the first power path, the limiter transfers the power to the second power path, thereby enables to achieve various percentage of output.

8. The apparatus of claim 1, further comprises a clutch connected to the third member to compensate an internal drop in the hydrodynamic-based locking mechanism.

9. The apparatus of claim 1, further comprises a set of rotors disposed at the third member and a stator disposed with the rotor, wherein the stator and rotor are configured to store power as a generator.

10. A continuous variable transmission apparatus comprising:
    an input member receives a rotational drive force from a drive source;
    a plurality of rotatable interconnecting members;
    a first node operatively connected to the input member via one of the interconnecting members;
    a second node meshingly engaged with the first node;
    a third node operatively connected to the second node via one of the interconnecting members;
    a fourth node meshingly engaged with third node;
    an output member operatively connected to the fourth node via one of the interconnecting members, configured to transmit the rotational drive force to a drive wheel;
    a casing assembly rotatably couples the input member and the output member, wherein the casing assembly encases the first node, the second node, the third node and the fourth node, wherein the interconnecting member connecting the third node and the second node is operatively connected to the casing assembly, the casing assembly comprises a central member sandwiched between a first member and a second member, and a third member, the central member comprises an aperture contoured to encompass the first node and the second node, and
    a locking mechanism configured to lock the first node and the second node,
       wherein the rotational drive force is transmitted from the input member to the output member through a path connecting the first node, the second node, the third node and the fourth node, wherein the output member resists rotation on receiving the drive force,
       wherein selective movement of the input member transmits the force back to the casing assembly that causes rotation of the casing assembly,
       wherein movement of the input member increases torque and causes the output member to rotate slowly decreasing output speed forming a first power path, and
       wherein the locking of the first node and the second node, and movement of the input member transmits force to the output member through rotation of the casing assembly forming a second power path.

11. The apparatus of claim 10, wherein the locking mechanism is a hydrodynamic-based locking mechanism.

12. The apparatus of claim 10, wherein the locking mechanism comprises a channel fluidly connected to the aperture and a valve for controlling passage of a fluid from the channel.

13. The apparatus of claim 10, wherein the rotational force at the first and second node causes flow of fluid.

14. The apparatus of claim 12, wherein the fluid flows without resistance on opening a passage of the channel, wherein pressure of the fluid increases on one side of the first and second node, and decreases on another side of the first and second node on narrowing the passage of the channel, and wherein pressure of the fluid increases and provides a rebounding force against the rotation of the first node and the second node on closing the passage of the channel.

15. The apparatus of claim 10, further comprises a limiter disposed at the first power path, the limiter transfers the power to the second power path, thereby enables to achieve various percentage of output.

16. The apparatus of claim 11, further comprises a clutch connected to the third member to compensate an internal drop in the hydrodynamic-based locking mechanism.

* * * * *